April 30, 1968  R. S. EMERSON  3,380,315
VARIABLE SPEED GEAR
Filed Oct. 12, 1965
2 Sheets-Sheet 1
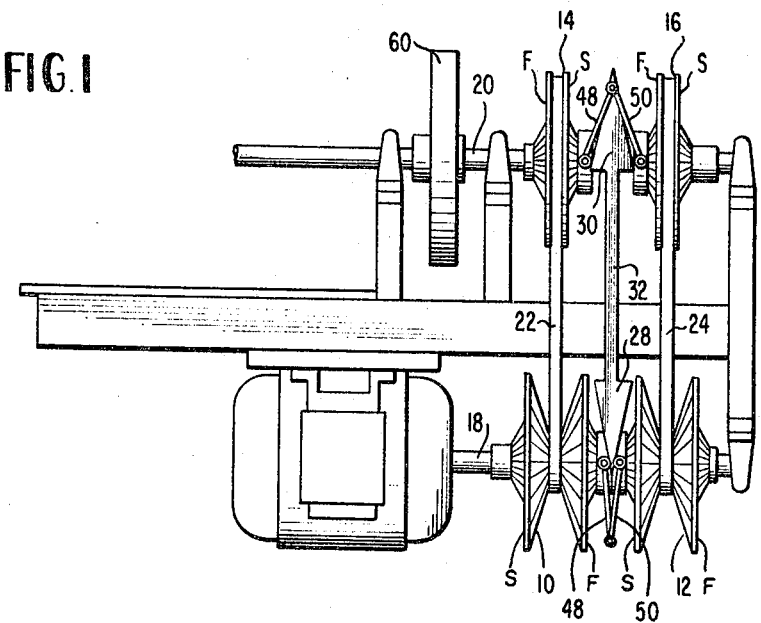
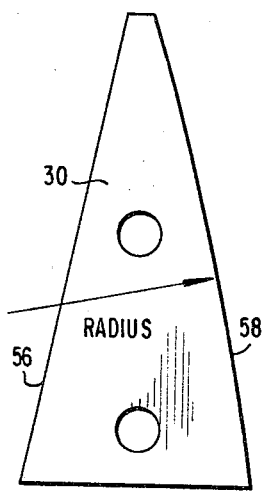
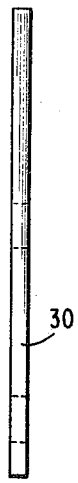
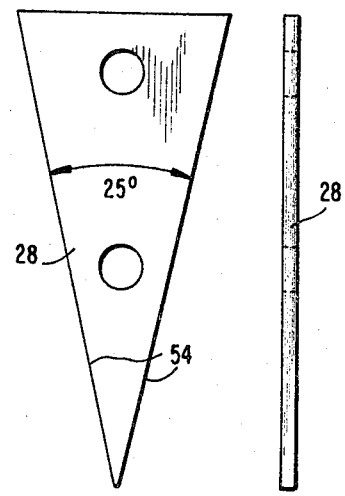
INVENTOR
REGINALD STANLEY EMERSON
BY *Imrie and Smiley*
ATTORNEYS

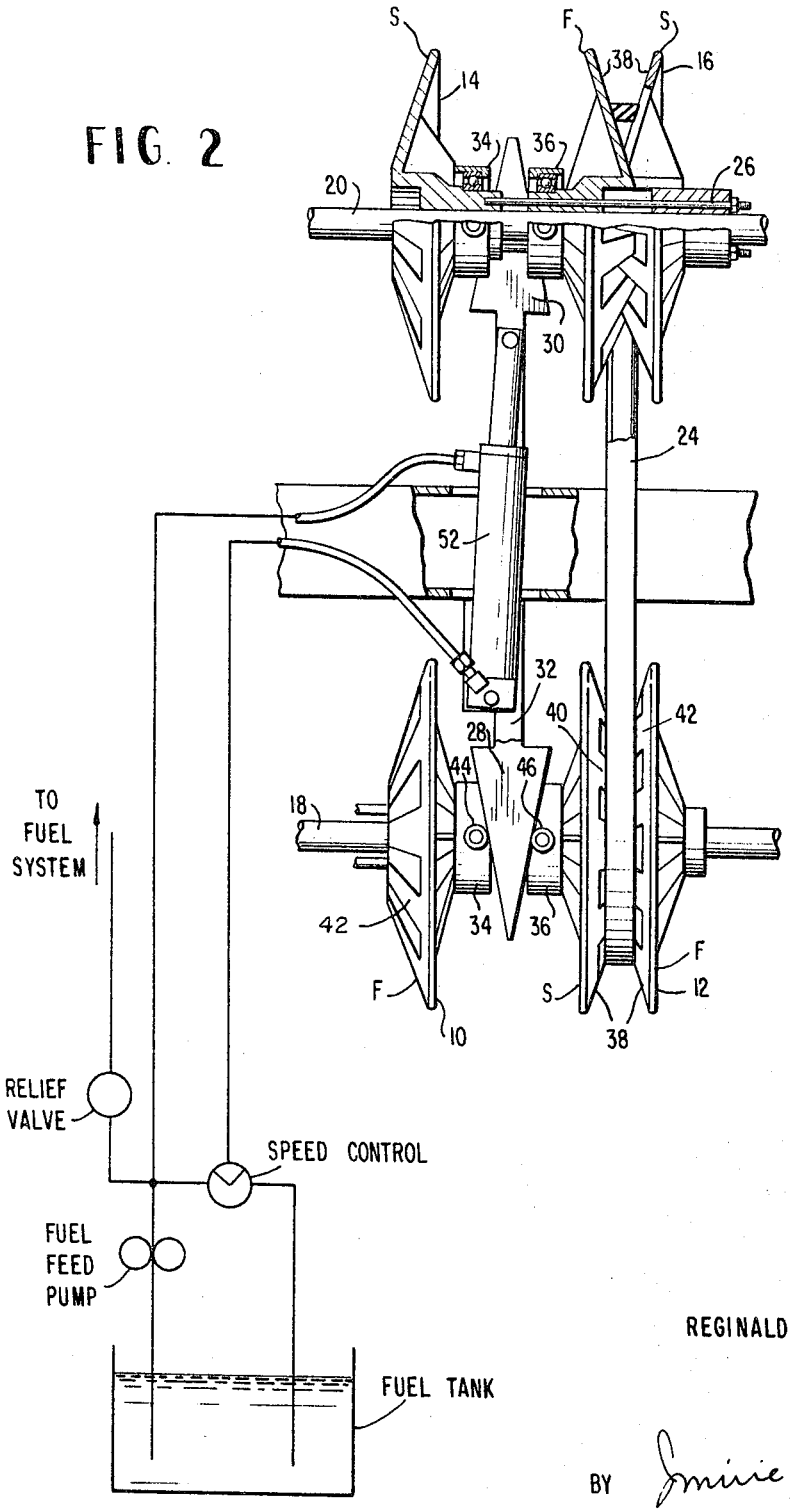

United States Patent Office 3,380,315
Patented Apr. 30, 1968

3,380,315
VARIABLE SPEED GEAR
Reginald S. Emerson, 34 Highlands Road, Buckingham,
Buckinghamshire, England
Filed Oct. 12, 1965, Ser. No. 495,232
Claims priority, application Great Britain, Oct. 14, 1964,
41,917/64
5 Claims. (Cl. 74—230.17)

ABSTRACT OF THE DISCLOSURE

A variable speed drive including a pair of parallel shafts each carrying at least two expansible-contractible pulleys and belts trained around the corresponding pulleys on the shafts. The pulleys each comprise an axially fixed half and an axially movable half and the pulley halves are arranged on their respective shafts to maintain the belts substantially at right angles to the shafts.

BACKGROUND OF INVENTION

One well known type of variable speed drive makes use of so-called "expanding" pulleys. These pulleys are formed in two halves which are provided with opposed conical surfaces serving to engage the edges of a belt passing around the pulley. One or both of these halves is arranged for limited axial movement towards and away from the other half, and in this way the effective diameter of the pulley can be varied. A change of speed in the drive as a whole is therefore achieved by opening or closing the gap between the two halves of one or more pulleys in the drive.

SUMMARY OF INVENTION

The present invention is concerned with a variable speed drive which comprises a pair of parallel shafts each carrying at least two expanding type pulleys having a stationary half and an axially movable half. The two pulleys on each shaft are drivingly connected by separate belts to the corresponding pulleys on the other shaft, the belts being maintained substantially at right angles to the shafts by arranging the pulley halves on one shaft in the order: stationary half of first pulley, axially movable half of first pulley, stationary half of a second pulley, axially movable half of second pulley, while the pulley halves on the other shaft start off with the axially movable half of the first pulley. The axially movable pulley halves on each shaft are connected together by tie rods which pass through the stationary pulley half located between them, and axial movement of the movable pulley halves is effected by wedges which are movable transversely to the shaft axes and engage abutment members associated with the movable pulley halves.

BRIEF DESCRIPTION OF DRAWINGS

A specific variable speed drive in accordance with the invention is shown by way of example in the accompanying drawings, in which:

FIGURE 1 is a side view of the drive;
FIGURE 2 is an enlarged view of part of FIGURE 1 illustrating certain details of the drive;
FIGURE 3 is an enlarged view of the upper wedge 10 shown in FIGURE 1;
FIGURE 4 is an edge view of the wedge shown in FIGURE 3;
FIGURE 5 is an enlarged view of the lower wedge 10 shown in FIGURE 1, and
FIGURE 6 is an edge view of the wedge shown in FIGURE 5.

DETAILED DESCRIPTION

The variable speed drive shown in the drawings is provided with four pulleys 10, 12, 14 and 16, two pulleys 10 and 12 on a power input shaft 18 and two pulleys 14 and 16 on a power output shaft 20. The two shafts 18 and 20 are arranged parallel to each other and have their pulleys so located that the two pulleys 10 and 12 on the input shaft 18 drive the two pulleys 14 and 16 on the output shaft 20 through separate belts 22 and 24. Each pulley comprises an axially-stationary half F and an axially-movable half S, the two movable halves S on each shaft 18 and 20 being connected to each other by tie-rods 26 or other connecting means so that they move in unison.

Opening or closing of the gap between the two halves of each pulley is effected by two generally V-shaped wedges or cams 28 and 30 provided at the ends of a rod 32 in the manner of spearheads. This rod 32 extends between the two shafts 18 and 20 and is arranged for axial movement in a direction transverse to the axes of the two shafts. It will be seen fom the FIGURE 2 that in actual fact there are two wedges 28 and two wedges 30, one pair of upper and lower wedges 28 and 30 being arranged on one side of the shafts 18 and 20, and the other pair of wedges being arranged on the other side of the shafts 18 and 20. However, in the description which follows, only one pair of wedges 28 and 30 will be described as the other pair are of the same construction. The two wedges 28 and 30 shown in FIGURE 1 are each interposed between a collar 34 fixed to one of the axially-stationary pulley halves F and a collar 36 fixed to one of the axially-movable pulley haves S, so that axial movement of the rod 32 carrying the wedges 28 and 30 causes the spacing between the appropriate pulley halves to be varied. In this connection it will be appreciated that, when the pulleys on one shaft are being expanded, the pulleys on the other shaft are being contracted. It thus follows that axial movement of the wedge-carrying rod in a direction transverse to the axes of the shafts causes the two pulleys on one shaft to be expanded and the two pulleys on the other shaft to be contracted. Reversal of the direction of movement of the rod will then result in the expanded pulleys being contracted and the contracted pulleys being expanded. The two belts therefore work in parallel and in synchronism with each other, the use of two belts being preferable to the use of one belt from the point of view of torque and other factors. The four pulley halves on each shaft are arranged in the order: stationary half of pulley A, axially movable half of pulley A, stationary half of pulley B, axially movable half of pulley B, while the four pulley halves on the lower shaft 18 are arranged in the order: axially movable half of pulley A, stationary half of pulley A, axially movable half of pulley B, stationary half of pulley B. By this means the belts 22 and 24 are maintained at right angles to the shafts 18 and 20 which is very important if chaffing and distortion of the belts is to be avoided.

As explained above, the principle underlying expanding pulleys is that, by changing the gap between their two halves, their effective diameter can be changed as desired. For this purpose, the two halves F and S of each pulley are provided with opposed conical surfaces 38 which are engaged by the edges of the belt 22 or 24 passing around the pulley. Slippage between the two halves is prevented by interengaging teeth 40 and 42 or tongue-and-groove connections between them so that, once the pulley halves have been adjusted to the required effective diameter, the pulley functions in the same way as a nonexpanding pulley.

The lateral edges of the wedges 28 and 30 do not bear on the collars 34 and 36 themselves but on radially-projecting studs or rollers 44 and 46 carried on the outer cylindrical surfaces of the collars. It is naturally important that the two studs or rollers 44 and 46 which are engaged by each wedge 28 or 30 should not creep relatively to each other around the shaft axis, and this is ensured by linking the two studs or rollers together by a V-shaped linkage formed of two pivotally connected levers 48 and 50. Such a linkage does what is required of it without in any way impeding axial movement of the two movable pulley halves.

Axial movement of the rod 32 carrying the two wedges 28 and 30 can be effected in a number of ways. One possibility is to move it by hand through, say a lever or a hand screw. It is preferred however that the rod should be moved by some form of power mechanism, and one satisfactory answer is to move it by a double-acting differential ram 52. This is particularly advantageous in those cases where the drive mechanism is used to drive a pump, for it then becomes an easy matter to make use of some of the liquid delivered by pump as hydraulic liquid for the ram. One such example is where the drive is used in pump-testing appartus to drive the pump of a compression ignition engine under test. The fuel oil delivered by a feed pump to the pump under test is entirely satisfactory as hydraulic liquid for the ram, and a valve-controlled bypass is therefore provided for diverting some of the feed pump output to the ram.

An important advantage arising out of the use of wedges or cams to expand or contract the pulleys is that the edges or profiles of the wedges or cams can be shaped to produce nonproportional displacement of the movable pulley halves. Thus, it is found that at certain driving ratios provided by the variable speed drive, the movable pulley halves S on the output shaft 20 need to be displaced through a distance which is a little different from the displacement of the movable pulley halves S on the input shaft 18. This is particularly noticeable at extremes of ratio and is due to variations in the tightness of the belts at these ratios. The wedges or cams are accordingly shaped or profiled to provide for this differential movement, one particular arrangement shown in FIGURES 3–6 being to provide a wedge 28 with straight edges 54 for moving the movable pulley halves S on the input shaft 18, and to provide a wedge 30 with one straight edge 56 and one slightly crowned or convex edge 58 for moving the movable pulley halves S on the output shaft 20. The edges of the wedges can also be further modified to correct the tendency which sometimes exists in such drives for the control at low speeds to be over-fine and the control at high speeds to be over-coarse.

As already mentioned above, the wedges 28 and 30 are interposed between studs or rollers 44 and 46 on collars 34 and 36 connected to the stationary and movable pulley halves F and S respectively. This means that the wedges and the rod 32 carrying them are fully supported without the need for pivotal mountings or slides. In addition, the reaction on the pulleys to the thrust of the wedges almost exactly balances the tension of the belts so that bearing loads are reduced. It will of course be appreciated that, because two pairs of wedges are provided, the collars 34 and 36 are held against any rotation.

The invention is particularly applicable to test benches for testing the fuel pumps of compression ignition engines. Such test benches require a compact variable speed drive which is able to drive the pump under test at a large number of different speeds, and the drive described above is ideal for this use. The range of speed ratios given by the pulleys is increased by coupling the output shaft to a differential gear, and a flywheel 60 of mild steel capable of running at speeds in excess of 5,000 r.p.m. is also fitted to the same shaft.

I claim:
1. A variable speed drive comprising two parallel shafts, at least two expanding-type pulleys carried on each of said shafts, said pulleys each comprising two halves provided with opposed conical surfaces and at least one half of each pulley being axially movable over a limited distance on the respective shaft towards and away from said other half of the pulley whereby the effective diameter of each pulley may be varied, the four pulley halves on one shaft being arranged in the order: stationary half of first pulley, axially movable half of first pulley, stationary half of second pulley, axially movable half of second pulley, and the four pulley halves on the other shaft being arranged in the order: axiallymovable half of first pulley, stationary half of first pulley, axially movable half of second pulley, stationary half of second pulley, a belt passing around the said first pulleys on each shaft and engaging the opposed conical surfaces of said two pulleys, a second belt passing in like manner to said first belt around the said second pulleys on each shaft and engaging the opposed conical surfaces of said second two pulleys, at least one tie rod connecting together the two axially movable pulley halves on each shaft whereby the said pulley halves move in unison, said tie rod passing through the stationary pulley half located between the axially movable pulley halves, a pair of movable wedges, one for the pulleys on one shaft and the other for the pulleys on the other shaft, arranged to engage abutment members associated with the axially movable halves of the pulleys, means supporting said wedges, said means being arranged to move said wedges in unison in a direction transverse to the axes of the shafts whereby to cause axial movement of said axially movable pulley halves.

2. A variable speed drive according to claim 1, wherein the lateral edges of the wedges bear on stud-like projections carried on collars fixed to the axially movable halves of the pulleys, the stud-like projections on adjacent collars being linked together by a V-shaped linkage formed on two pivotally-connected levers.

3. A variable speed drive according to claim 1, characterized in that there are two wedges for expanding and contracting the two pulleys on each shaft, one wedge being arranged on one side of the respective shaft and the other wedge being arranged on the other side of said shaft.

4. A variable speed drive according to claim 1, characterized in that the wedges are generally V-shaped, the two lateral edges of each wedge both bearing on stud-like projections carried on collars fixed to the axially movable halves of the pulleys.

5. A variable speed drive according to claim 1 characterized in that one wedge has straight lateral edges, while the other wedge has one straight lateral edge and one slightly crowned or convex lateral edge.

References Cited

UNITED STATES PATENTS

| 1,235,794 | 8/1911 | Hardaker | 74—230.17 |
| 1,236,749 | 8/1917 | Osser | 74—230.17 |
| 2,308,868 | 1/1943 | Durdin | 74—230.17 |
| 3,267,760 | 8/1966 | Wenning | 74—230.17 |

FOREIGN PATENTS

| 707,483 | 4/1954 | Great Britain. |
| 1,014,284 | 8/1952 | France. |

FRED C. MATTERN, JR., *Primary Examiner.*

C. J. HUSAR, *Assistant Examiner.*